United States Patent
Moseley

(10) Patent No.: US 7,502,459 B1
(45) Date of Patent: Mar. 10, 2009

(54) UNIFIED SERVICES ENTITLEMENT ARCHITECTURE

(75) Inventor: Edward Moseley, Sunnyvale, CA (US)

(73) Assignee: Adaptec, Inc., Milpitas, CA (US)

( * ) Notice: Subject to any disclaimer, the term of this patent is extended or adjusted under 35 U.S.C. 154(b) by 807 days.

(21) Appl. No.: 10/086,270

(22) Filed: Feb. 28, 2002

(51) Int. Cl.
*H04M 3/00* (2006.01)

(52) U.S. Cl. .................. 379/265.02; 379/265.03; 705/9; 340/539.13

(58) Field of Classification Search .............. 379/32.04, 379/357.03, 357.04, 265.01–266.08, 88.22; 455/414.2; 705/7, 9, 26, 27, 8; 707/102, 707/1; 709/220; 713/182; 369/53.21; 340/539.13
See application file for complete search history.

(56) References Cited

U.S. PATENT DOCUMENTS

| | | | | |
|---|---|---|---|---|
| 4,535,204 A | * | 8/1985 | Hughes et al. | 379/357.04 |
| 5,430,866 A | * | 7/1995 | Lawrence et al. | 714/20 |
| 5,694,464 A | * | 12/1997 | Mashinsky | 379/357.03 |
| 6,064,730 A | | 5/2000 | Ginsberg | 379/265.09 |
| 6,100,891 A | | 8/2000 | Thorne | 345/854 |
| 6,163,607 A | | 12/2000 | Bogart et al. | 379/266.01 |
| 6,272,216 B1 | | 8/2001 | Vaios | 379/265.01 |
| 6,327,363 B1 | * | 12/2001 | Henderson et al. | 379/265.01 |
| 6,347,139 B1 | | 2/2002 | Fisher et al. | 379/265.12 |
| 6,356,632 B1 | | 3/2002 | Foster et al. | 379/265.04 |
| 6,542,601 B1 | * | 4/2003 | Hernandez et al. | 379/265.01 |
| 6,633,638 B1 | * | 10/2003 | De Trana et al. | 379/242 |
| 6,833,787 B1 | * | 12/2004 | Levi | 340/539.13 |
| 6,842,515 B2 | * | 1/2005 | Mengshoel et al. | 379/265.02 |
| 6,990,458 B2 | * | 1/2006 | Harrison et al. | 705/8 |
| 7,035,808 B1 | * | 4/2006 | Ford | 705/7 |
| 2001/0025258 A1 | * | 9/2001 | Foia et al. | 705/26 |
| 2001/0049263 A1 | * | 12/2001 | Zhang | 455/67.1 |
| 2002/0035495 A1 | * | 3/2002 | Spira et al. | 705/7 |
| 2002/0178364 A1 | * | 11/2002 | Weiss | 713/182 |
| 2002/0194047 A1 | * | 12/2002 | Edinger et al. | 705/9 |
| 2003/0041126 A1 | * | 2/2003 | Buford et al. | 709/220 |
| 2003/0061104 A1 | * | 3/2003 | Thomson et al. | 705/26 |
| 2004/0044585 A1 | * | 3/2004 | Franco | 705/26 |
| 2005/0177548 A1 | * | 8/2005 | Sanada et al. | 707/1 |

OTHER PUBLICATIONS

SAP online brochure, "mySAP™ CRM Service", 2001 by SAP AG.—7 pages.
USPTO Database Search, "TTL/call and TTL/center in 1996-2002"—3 pages.

* cited by examiner

*Primary Examiner*—MD S Elahee
(74) *Attorney, Agent, or Firm*—Martine Penilla & Gencarella, LLP

(57) ABSTRACT

A system, method and apparatus for determining a support entitlement level are provided. A product support request is received from a customer. A technical support identification (TSID) is also received from the customer. The TSID is validated and classified. The TSID may be classified into at least one of several classifications. One of the classifications is a contract classification. At least one of several support levels are assigned to the classified TSID. The assigned support level corresponds to the TSID classification. The TSID is received, validated, classified and the support level assigned before a product support agent is notified of the product support request. Then the assigned support level is delivered.

20 Claims, 9 Drawing Sheets

UNIFIED SERVICES ENTITLEMENT ARCHITECTURE

BACKGROUND OF THE INVENTION

1. Field of the Invention

The present invention relates generally to systems and methods for providing manufacturer support for products, and more particularly to a system, method and apparatus for automatically determining a level of product support authorized to a specific product unit.

2. Description of the Related Art

Most product manufacturers provide some level of product support such as providing technical assistance, warranty repairs, and technical assistance with operating and maintaining their product. For example, a computer is sold to an end user/customer. If the customer has a problem with the computer, then the customer will contact the manufacturer to provide some assistance in resolving his problem (i.e., provide some product support). Product support can include many levels of support ranging from one-on-one technical assistance from a product support agent, to providing warranty repairs and replacements and to providing access to a product support database (i.e., a knowledge base).

Various levels of support are typically offered during different portions of a product's serviceable lifetime. For example, a new product might include one-on-one product support term with the manufacturer's product support agent for the first 90 days after sale. After the first 90 days, only limited support is provided (i.e., access to a product knowledge base and warranty repair/replacement by mail, etc.) for yet another term such as one year after purchase. Eventually, the product may no longer be supported because the product is obsolete or for other business and/or technical reasons.

Product support terms and levels of product support are limited due to basic economics. A manufacturer "pays" for the product support costs from a portion of the price of the products sold. The product support budget is limited and therefore requires that the product support also have reasonable, economic limits.

FIG. 1 illustrates a prior art processing of a product support call from an end user/customer. In block 102, a product support call is received from a customer in a call center. Typically, a product support agent receives the customer's call. In block 104, the product support agent collects the product information from the customer. The product information includes the product identification information such as part numbers, unit serial number, manufacturer, where the customer purchased the unit, and many other questions simply to properly identify the unit. For example, if the unit is a peripheral card such as a SCSI controller card, and the unit is installed as part of a personal computer, then properly and completely identifying the unit can be difficult and time consuming.

Once the product is properly identified, then in block 110, the product support agent determines whether or not the customer is authorized any product support. Determining if the customer is authorized any product support can include researching through databases, determining if warranty period has expired, and other inquiries which consume more of the product support agent's time and effort. Often, a customer may not be sure of the manufacturer of the product and therefore may call the incorrect manufacturer's product support call center. In block 110, if the customer is authorized any product support, then the process continues in block 120 where the authorized levels of product support are provided to the customer. Then the call ends in block 140.

If the customer is not authorized any product support in block 110, then the process continues to block 130. In block 130, the product support agent determines whether or not the customer should receive any complimentary product support. Oftentimes the product manufacturer will wish to build customer goodwill by providing limited product support on a complimentary basis (i.e., complimentary product support) even though the product support term has expired. Further, the product support agent will often desire not to simply refuse to provide any type of support and just leave the customer without any direction or assistance. Therefore, limited complimentary product support is often provided. The complimentary product support is typically not in-depth troubleshooting but is limited to at least some advice or other assistance. Providing even complimentary product support incurs costs to the manufacturer in the form of product support agent man-hours being given away to the customer and therefore complimentary product support must have strict controls.

If in block 130, the product support agent decides to provide some complimentary product support, then in block 132, the complimentary product support is provided to the customer, and the call ends in block 140. If in block 130, the product support agent decides not to provide any complimentary technical support, then the call ends in block 140.

Often a customer will make a second product support call, even though he learned in the first call, such as described above, that he was outside the product support term of his product. When the customer's second call is received, a product support agent must again complete the entire process of FIG. 1. The customer's second call results in at least the additional expense of re-identifying the product and determining product support terms, etc. (i.e., blocks 102-110 of FIG. 1). In addition, if the customer's second call is received by a different product support agent than the first call, then the second product support agent may provide even more complimentary support. Under the prior art process described in FIG. 1, the product manufacturer is often forced to absorb many man-hours expended to providing unnecessary complimentary product support and for only identifying the product, etc.

In view of the foregoing, there is a need for a method for controlling the expense required to determine if product support is authorized for the customer's unit and for limiting any complimentary support provided to the customer.

SUMMARY OF THE INVENTION

Broadly speaking, the present invention fills these needs by providing a system, method and apparatus for determining a support entitlement. It should be appreciated that the present invention can be implemented in numerous ways, including as a process, an apparatus, a system, computer readable media, or a device. Several inventive embodiments of the present invention are described below.

A system, method and apparatus for determining a support entitlement level are provided. A product support request is received from a customer. A technical support identification (TSID) is also received from the customer. The TSID is validated and classified. The TSID may be classified into at least one of several classifications. One of the classifications is a contract classification. At least one of several support levels is assigned to the classified TSID. The assigned support level corresponds to the TSID classification. The TSID is received, validated, classified and the support level assigned before an agent is notified of the customer's request for product support. Then the assigned support level is delivered.

In one embodiment, the TSID is received, validated, classified and the support level assigned by an automated process where the customer communicates directly with a computer executing the automated process. In one embodiment, the customer uses a telephone to communicate directly with the computer executing the automated process.

In another embodiment, the automated process identifies illicit units and outputs a report of the identified illicit units so that the illicit units can be further investigated.

One of the advantages of the below described processes is that the customer's request for support will be evaluated and routed automatically without the assistance of a product support agent, thereby reducing the product support agent man-hours required to process customer requests for support.

Complimentary support is reduced by diverting customers that are not authorized any product support agent support to other support resources such as a knowledge base.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

Figure 1:
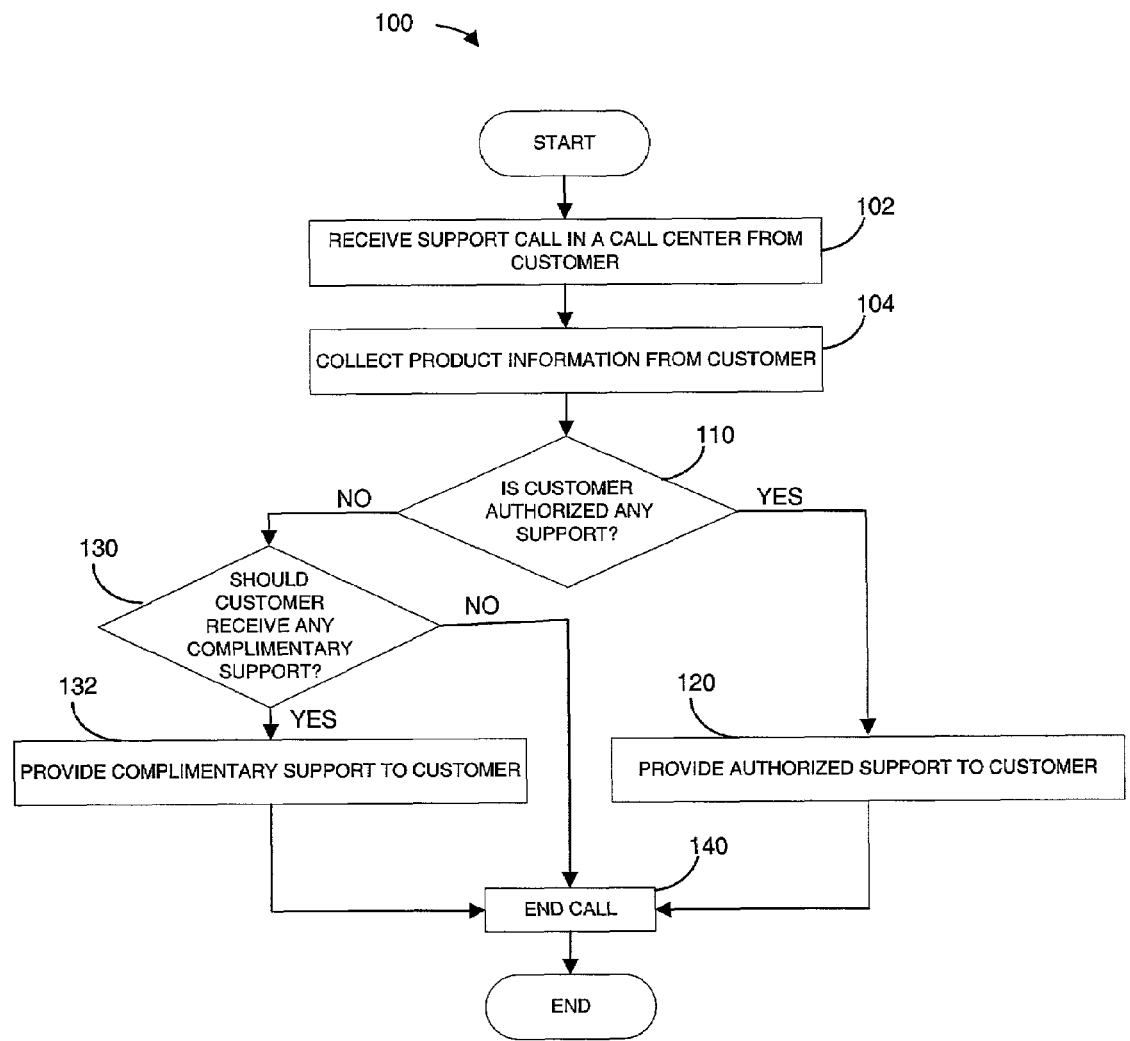
FIG. 1 illustrates a prior art processing of a product support call from an end user/customer.

An invention is described for determining an entitlement level of product support. It will be obvious, however, to one skilled in the art, that the present invention may be practiced without some or all of these specific details. In other instances, well known process operations have not been described in detail in order not to unnecessarily obscure the present invention.

Product manufacturers are under constant pressure to reduce costs in all facets of their operation. Product support costs must also be controlled. Customers, product counterfeiters, and product distributors often abuse product support offered by the product manufacturer. This abuse directly impacts the manufacturer's cost of product support. The described invention provides a method and system for a manufacturer to reduce the cost and increase the efficiency of providing product support by diverting customers that are not authorized product support agent support to other product support resources. Diverting non-authorized customers reduces the product support man-hour expenditures.

Customers often abuse product support. For example, a customer can knowingly provide product identification data (i.e., serial numbers, etc.) for a unit that is still within its product support term when actually seeking support for a like unit whose product support term has expired. Customers can also make multiple requests for complimentary product support when the customer knows their product support term has expired and that they are not authorized any additional product support.

A product counterfeiter can also abuse product support. A product counterfeiter sells a product from a first manufacturer that does not provide product support while misrepresenting the product as being from a second manufacturer that does provide product support. For example, a SCSI controller card, from FactoryX is misrepresented to a customer as being a similar card manufactured by Adaptec, Inc. The product counterfeiter misrepresents the counterfeit card because the customer will pay a higher price for the Adaptec product because the customer recognizes Adaptec's name and reputation for providing product support. When the customer seeks product support from Adaptec only to be informed that the unit is counterfeit and that Adaptec will not provide support. Further, Adaptec has wasted resources (i.e., product support agent man-hours) to inform the customer that no support is available.

The product distributors of legitimate products can also abuse product support. Often a manufacturer will sell a large quantity of a product in to an original equipment manufacturer (OEM). For example, Adaptec may sell a large quantity of SCSI controller cards to a personal computer manufacturerX. This is referred to as a sale in the OEM channel. ManufacturerX purchases the SCSI controller cards to be installed as part of their end product (i.e., a personal computer). Further, manufacturerX agrees to provide product support for the SCSI controller cards as part of the OEM product support they provide for their PCs. Therefore, Adaptec does not include the cost of any product support in the SCSI controller cards sold in the OEM channel to manufacturerX. Because Adaptec does not include the cost of product support in the OEM channel products, then the OEM channel products can be sold to manufacturerX at a lower cost.

Adaptec's product support is subject to abuse when manufacturerX refers customers that purchased manufacturerX PCs to Adaptec's product support call center for product support on the SCSI controller cards. Adaptec's product support can also be abused if manufacturerX sells the SCSI controller cards, purchased through the OEM channel, directly to retail customers (i.e., not as part of manufacturerX PCs). Effectively, manufacturerX is misrepresenting the source of product support to the PC customers and the retail SCSI card customers. In both instances, manufacturerX is attempting to transfer the cost of product support to Adaptec when the OEM channel SCSI drive controller cards were purchased without any product support.

Product support can also be purchased. For example, a customer may wish to purchase additional levels of support at any point in the product's serviceable life. These additional product support purchases can be incident based (i.e., fee based one-on-one support with a product support agent) or can be purchased in a bulk form such as a service contract or extended warranty. Often a customer may contact a product support call center several times before they have been properly identified as a service contract/extended warranty customer. Each call can consume product support agent man-hours.

Figure 2:
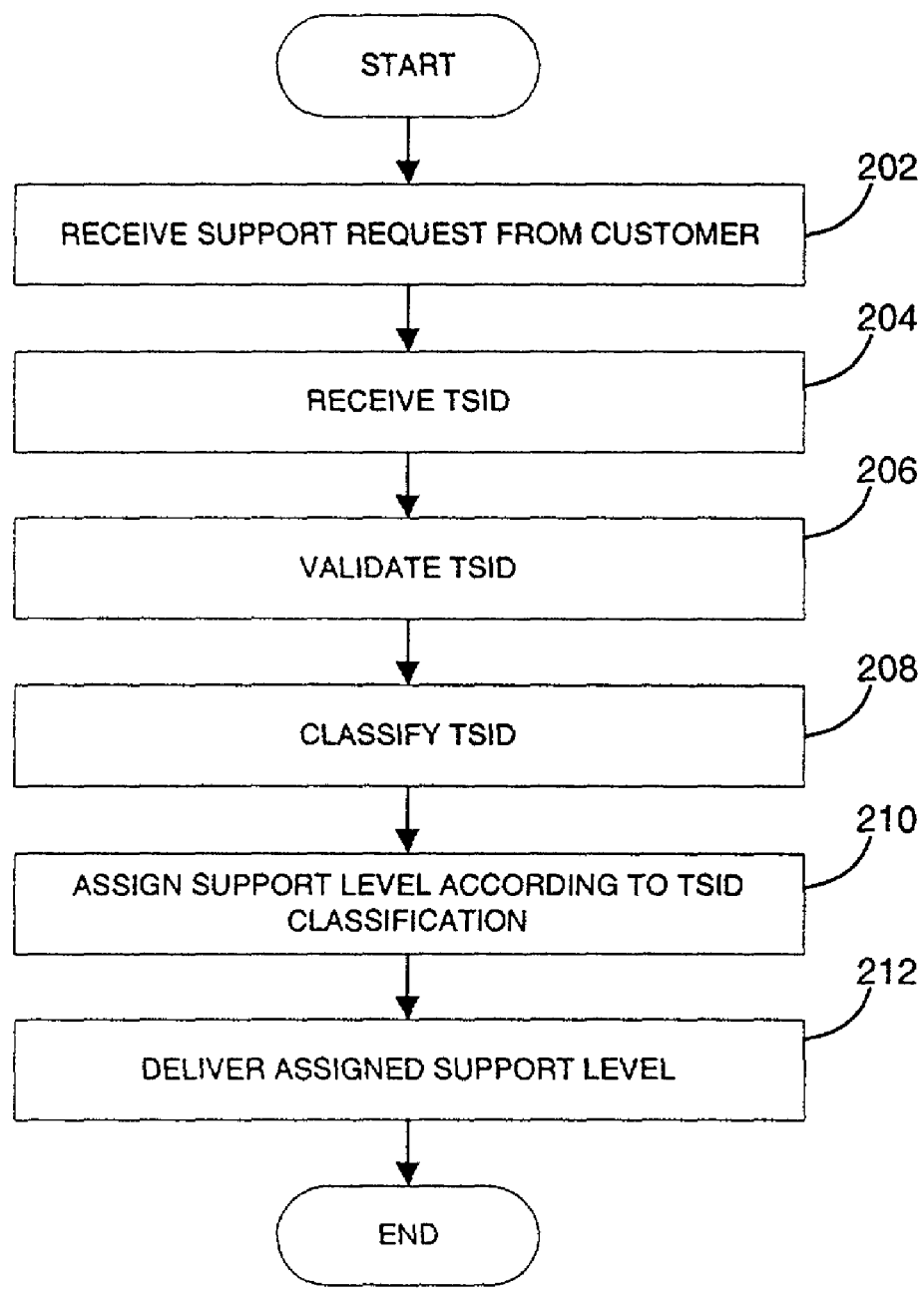
FIG. 2 illustrates one embodiment of a process for determining the product support entitlement for the customer.

FIG. 2 illustrates one embodiment of a process for determining the product support entitlement for the customer. In block 202, a product support request is received from a customer. The product support request could arrive via an Internet based request form, an email, a telephone call, fax, letter, etc. The product support request can also include customer identification data such as address, telephone number, email address, facsimile numbers, etc. In block 204, a TSID (TSID is a technical support identification) is received from the customer.

In one embodiment, the product support request is via a telephone call to the product support call center. The call is received in an automated call distribution switch (ACD). The ACD can automatically query the customer for various data fields such as the TSID, a unit serial number, a unit part number, or other unit identification data as will be described in more detail below. The customer enters information through the telephone keypad and/or through voice recognition applications. Alternatively, the call may be received via an interactive web site or an email where the customer is asked for the different unit identification data fields. If the unit that is the subject of the product support request is part of the customer's computer, then an interactive web site could automatically interrogate the customer's computer to identify the product.

The TSID may be a number, an alphanumeric code, or any other type of an identification that identifies that unit in at least one database that the ACD can access. The TSID can also identify more than one unit in the database. The TSID can also identify a service contract that might encompass the customer's unit. For example, the customer might have purchased an extended warranty on his manufacturerX PC. The manufacturerX PC is therefore identified by the TSID. Inside the manufacturerX PC is a peripheral device such as a SCSI controller card, a hard drive, a video card or other part of the PC, for which the customer is seeking support. The TSID can be provided in anyone of several methods. The TSID can be affixed to the unit or alternatively provided in documentation such as an owner's manual for the unit. The TSID could also be stored in a memory location in the unit if the unit includes a computer readable memory such as a ROM, EEPROM, flash memory and any other type of suitable memory. If the unit identified by the TSID is a software application, then the TSID could be included in the software application. The TSID can also be encrypted.

In block 206, the unit TSID is validated. The unit TSID can be validated any one of a number of ways. The unit TSID could be validated by comparing the unit TSID to other stored TSIDs in a database of valid TSIDs. Alternatively, confirming that the unit TSID has a correct format can also validate the unit TSID. A valid unit TSID can also include a checksum value. The unit TSID can also be validated in any one or more of many other methods of validating the TSID that are known in the art.

In block 208, the unit TSID is classified. The unit TSID can be classified based on any one or more of several aspects of the unit, the end item (i.e., the computer that includes the unit), the service contract or extended warranty that includes the unit, or other aspects as will be described in more detail below. The unit TSID classification is then used in block 210 to determine a support level. Table 1 below lists several example TSID classifications. Other classifications could also be used.

TABLE 1

| Classification | Description |
| --- | --- |
| Retail | Unit purchased at retail outlet |
| OEM | Unit purchased as part of an OEM product |
| Contract | Unit covered by a service contract |
| Illicit | Unit is counterfeit or improperly sold from the OEM channel |
| No Longer Supported | No support available |
| Limited Support | Some limited level of support available |
| Return Materials Authorization (RMA) | Unit due for return to manufacturer |

One or more support levels could be assigned to each TSID classification. For example, support levels can include on-site support (providing product support agents on the customer's site), one-on-one support (providing one-on-one access to a product support agent), email support (responding to emails from customers), knowledge base access support (providing access to a technical database, such as via the Internet). Support levels can also include combinations and variations of the example support levels described above and additional support levels. In addition, the support term for each support level can be adjusted as desired. The classifications can also be prioritized such that if one TSID were classified in one or more classifications, then the support level assigned to the highest classification would take priority. For example, if a TSID was classified as both a retail TSID and a contract TSID (i.e., an extended warranty was purchased for the TSID), then the contract TSID classification could be given priority.

In one embodiment, the processes up to determining the product support level are completed automatically and without requiring any one-on-one access to a product support agent. Thereby substantially eliminating the man-hour cost of having a product support agent determining the product support level that the customer's unit is authorized.

In block 212, the assigned support level is delivered. For instance, if a customer's unit is authorized direct one-on-one technical assistance with a product support agent in block 210, then the customer can then opt to speak directly to a product support agent. If the customer's unit is authorized email only support or a combination of email and knowledge base access, then the customer may be referred to those resources and provided with instructions to access those resources.

Figure 3:
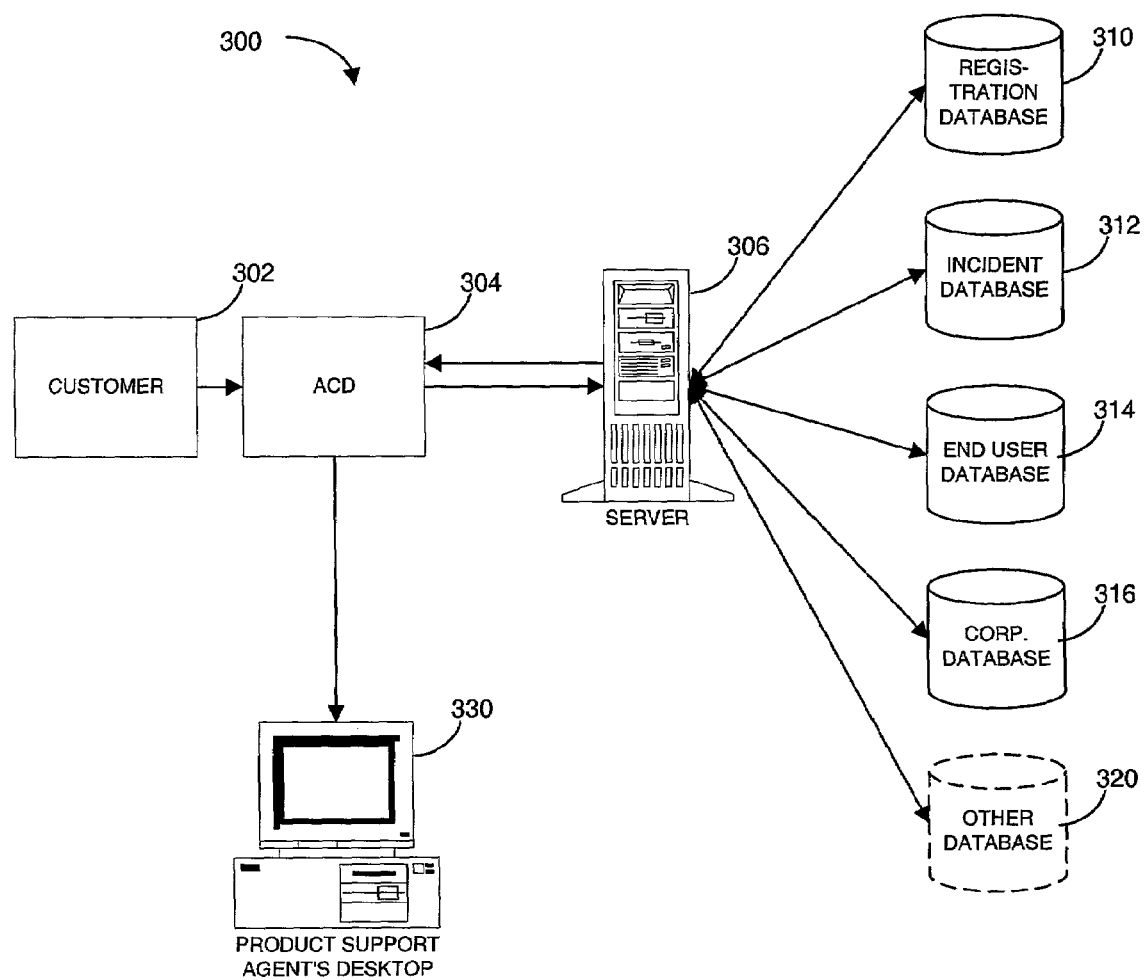
FIG. 3 illustrates one embodiment of the system for determining a support entitlement.

FIG. 3 illustrates one embodiment of the system for determining a support entitlement. Block 302 represents a customer. The customer 302 contacts the ACD 304. The ACD 304 in turn accesses and retrieves data from the server 306. The server 306 can access many databases, such as a registration database 310, an incident (call) database 312, a user information database 314, a corporate/contract database 316, and other databases 320 that are not specified such as a manufacturing database, a shipping database, a sales database and other databases. The server 306 accesses any of the databases 310, 312, 314, 316, 320 to carry out the functions in blocks 206 through 210 of FIG. 2. If the customer is authorized one-on-one support from a product support agent then, the incident (i.e., the customer's request for product support) is transferred to the agent's desktop 330 by the ACD 304. In one embodiment, the process prior to reaching a product support agent is automated where the customer enters data into a computer (i.e., the ACD 304). In contrast, the prior art systems required the agent to retrieve all of the data from the customer and manually enter the data to determine what support level (if any) if the customer is authorized.

The ACD 304 provides the initial interface with the customer. The ACD 304 and server 306 determine and authorize the correct levels of product support. If a one-on-one level of support is authorized, then the ACD 304 transfers the new incident and any open incidents to the product support agent. In one embodiment, the new incident and any open incidents are transferred to the product support agent's desktop 330. The product support agent's desktop 330 is typically a computer interface that assists the product support agent to access the data in the databases 310-320 and assist the customer most efficiently. Alternatively, the product support agent's desktop 330 could include connecting the telephone call from the customer to the product support agent.

Figure 4A:
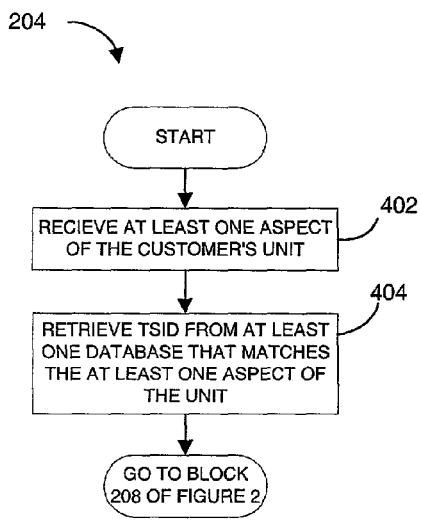
FIG. 4A illustrates one embodiment of the process of receiving a TSID.

FIGS. 4A through 4H illustrate various embodiments of some of the intermediate processes of FIG. 2. FIG. 4A illustrates one embodiment of the process of receiving a TSID. In block 402, at least one aspect of the customer's unit is received, such as: a TSID, a serial number, a part number, a model number, etc. The aspects received include sufficient data that would allow the ACD 304 and the server 306 to identify the TSID that includes the customer's unit. The TSID may be identified in any one or more of the several databases 310-320. Of course, if the customer has the TSID in block 204, he would have input the TSID, and therefore, other aspects of the unit may not be necessary to retrieve additional details about the unit from the database. In one embodiment, if the TSID corresponds to a unit that is not registered, then the customer may be directed to a registration process to fully register the unit. In block 404, the TSID is then retrieved from at least one database that matches at least one aspect of the unit. The process then returns to block 206 of FIG. 2.

Figure 4B:
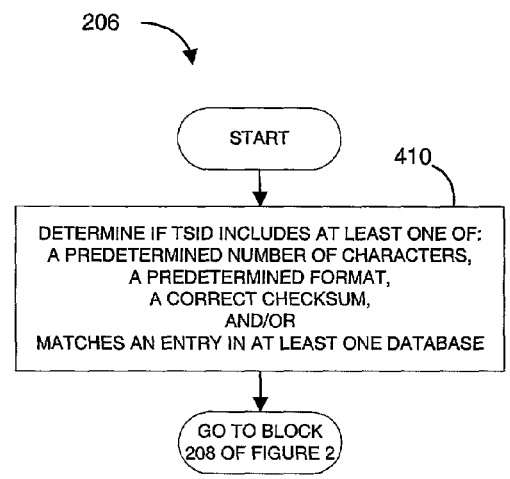
FIG. 4B illustrates one embodiment of validating the TSID.

FIG. 4B illustrates one embodiment of validating the TSID such as block 206 of FIG. 2. In block 410, the TSID can be examined to determine if it has at least one of: a predetermined number of characters, a predetermined format, a correct checksum, a matching entry in at least one of the databases, or other methods of validating the TSID. Validating the TSID confirms that the customer is providing a valid TSID and not a fictitious TSID. The process then returns to block 208 of FIG. 2.

Figure 4C:
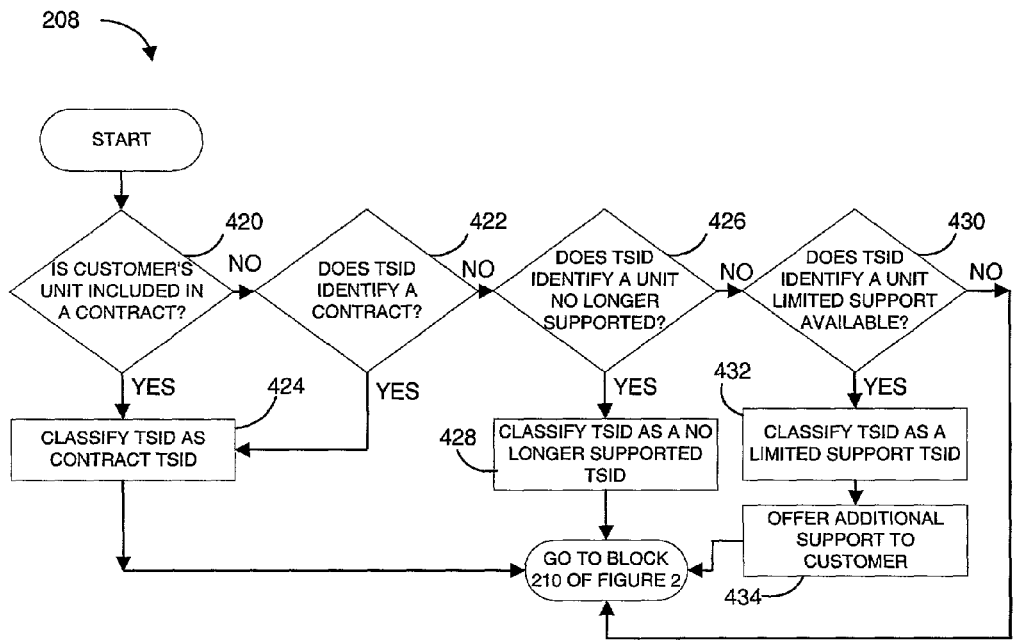
FIG. 4C illustrates several embodiments of classifying the TSID.

FIG. 4C illustrates several embodiments of classifying the TSID such as in block 208 of FIG. 2. In block 420, the customer's unit is analyzed to determine if the unit is included in a service contract or extended warranty. If the customer's unit is identified as being included in a service contract or extended warranty, then the TSID is classified as a contract TSID in block 424. If, in block 420, the customer's unit is not identified as being included in a service contract or extended warranty, then the TSID is analyzed in block 422. In block 422, the TSID is analyzed to determine if the TSID identifies a service contract or extended warranty. If the For example, TSID identifies a service contract or extended warranty, then the TSID is identified as a contract TSID in block 424. A TSID can identify an individual unit. Alternatively, the TSID can identify a specific service contract or extended warranty. The service contract or extended warranty then includes a list of units covered by the service contract or extended warranty.

If, in block 422, the TSID does not identify a service contract or extended warranty, then, in one embodiment, the process can continue in block 426. In block 426, the TSID is analyzed to determine if the TSID identifies a unit that is no longer supported. If the TSID does identify a unit that is no longer supported, then in block 428, the TSID is classified as a no longer supported TSID. An example of a no longer supported TSID is a unit where the product support data is not available. A no longer supported product may be an antiquated product and therefore product support is no longer available. If the TSID does not identify a unit that is no longer supported in block 426, then another embodiment could further analyze the TSID. For instance, in block 430, the TSID is analyzed to determine if the TSID identifies a unit that has only a limited product support level available. If the TSID identifies a unit that has only limited product support level available such as described above, then in block 432, the TSID is classified as a limited support TSID.

In one alternative embodiment, additional support could be offered to the customer on a support-for-fee basis. For example, the TSID may identify a unit that has passed its free support level period. Therefore, the customer may be offered a service contract or a fee-for-incident product support. Often, a computer peripheral device, such as a hard drive will have a 90 days from purchase product support period. After that 90 days, one-on-one product support is no longer available and the customer may desire to purchase additional support. Returning to block 430 above, if no limited product support is available, then the process continues to block 210 of FIG. 2.

Figure 4D:
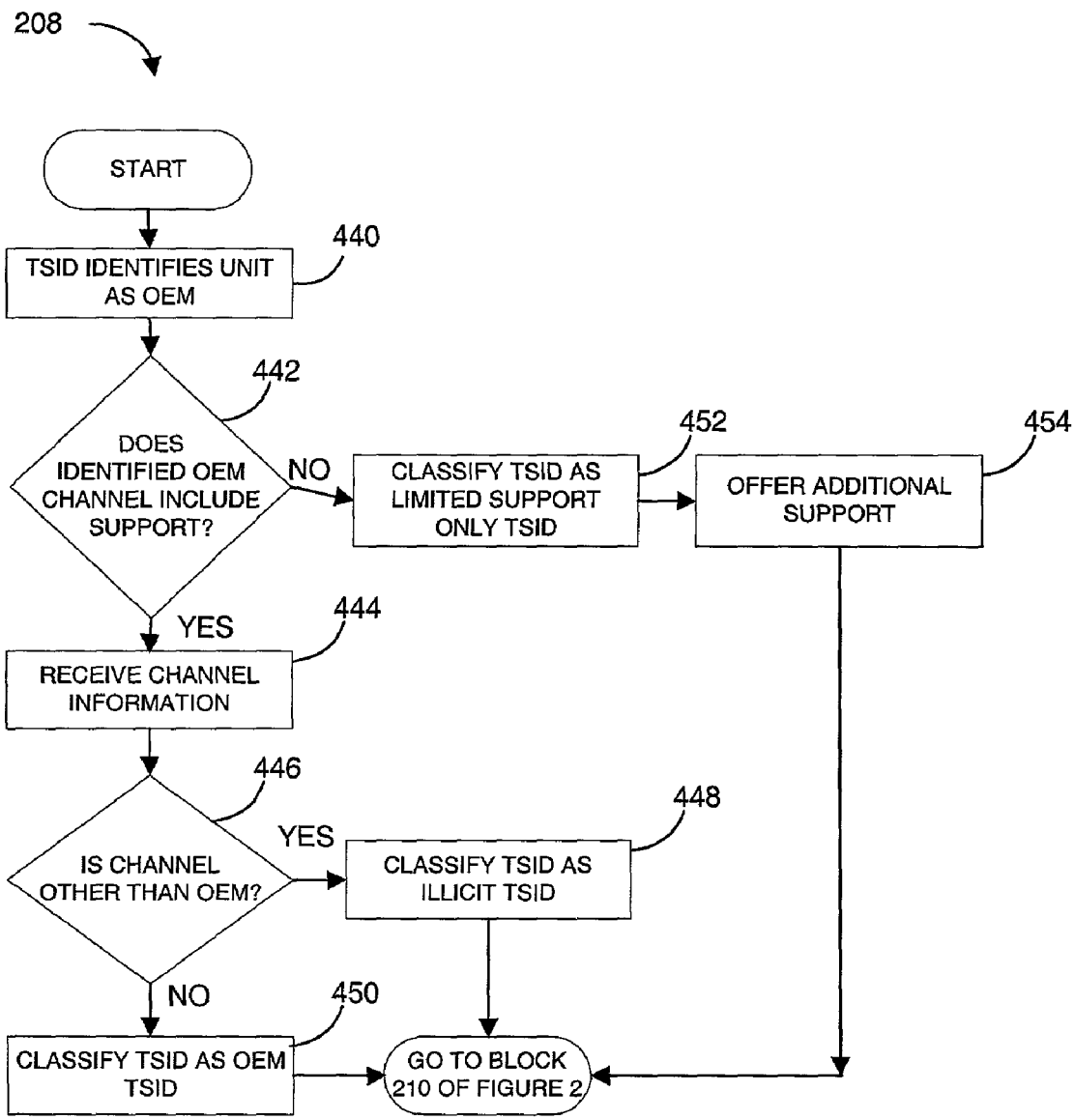
FIG. 4D illustrates yet another alternative embodiment of classifying the TSID.

FIG. 4D illustrates yet another alternative embodiment of classifying the TSID such as in block 208 of FIG. 2. In block 440, the TSID identifies the unit as an OEM unit because the unit was delivered through an OEM channel as described above. In one embodiment, there may be multiple OEM channels. For example, a first OEM channel may include no product support. A second OEM channel may include only returns and replacements (RMAs) or other levels of product support. In block 442, the OEM channel is analyzed to determine if the OEM channel includes any support. If the OEM channel includes product support, then the channel information is received from the customer in block 444. The OEM channel information includes information identifying where the customer actually purchased the unit (i.e., from an OEM as part of an end-item from the OE manufacturer, or retail from the OE manufacturer, or another retail source, etc.). Block 446 analyzes the received channel information. If the channel that is identified in the channel information is something other than as part of an OEM product then, the TSID is classified as an illicit TSID. If in block 446, the channel is as part of an OEM product then, the TSID is classified as an OEM TSID.

Returning to block 442 above, if the identified OEM channel does not include support, then in one embodiment, the TSID is identified as being a limited support TSID in block 452. Alternatively, in block 452, the customer could be referred to the OEM for product support. A combination of providing limited support and referring to the OEM for product support could also be provided in block 452. Additional support could also be offered for sale, such as in block 454. Alternatively, if there is no OEM channel product support in block 442, then the TSID could be classified as a no longer supported TSID, such as in block 426 of FIG. 4C. In an alternative embodiment, block 426 of FIG. 4C could occur in place of block 452.

Figure 4E:
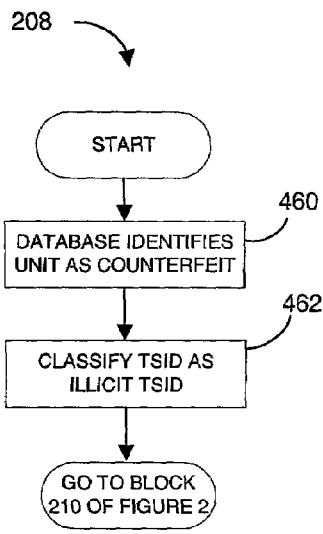
FIG. 4E illustrates yet another embodiment of classifying the TSID.

FIG. 4E illustrates yet another embodiment of classifying the TSID, such as in block 208 from FIG. 2. In block 460, the unit is identified as a counterfeit unit in at least one of the databases 310-320. The TSID is identified as an illicit TSID in block 462. One embodiment of an illicit TSID is a misrepresented product or an illegal copy of the product. The TSID might also be assigned a unit other than the customer's unit. The TSID might be assigned to another customer. For another example, if the product is a software product, a TSID could be valid for an installation in a first computer but not valid for an installation on a second computer and therefore might be illicit. In one embodiment, the illicit TSIDs can be exported to other databases and other entities for follow-up, such as reports could be made to Business Software Alliance for further investigation. Reports could also be sent to other similar internal or external entities for researching illicit hardware and software users. When a TSID is classified as an illicit TSID (i.e., block 448 of FIG. 4D, and block 462 of FIG. 4E) then the customer may be notified that the customer's unit is illicit.

Figure 4F:
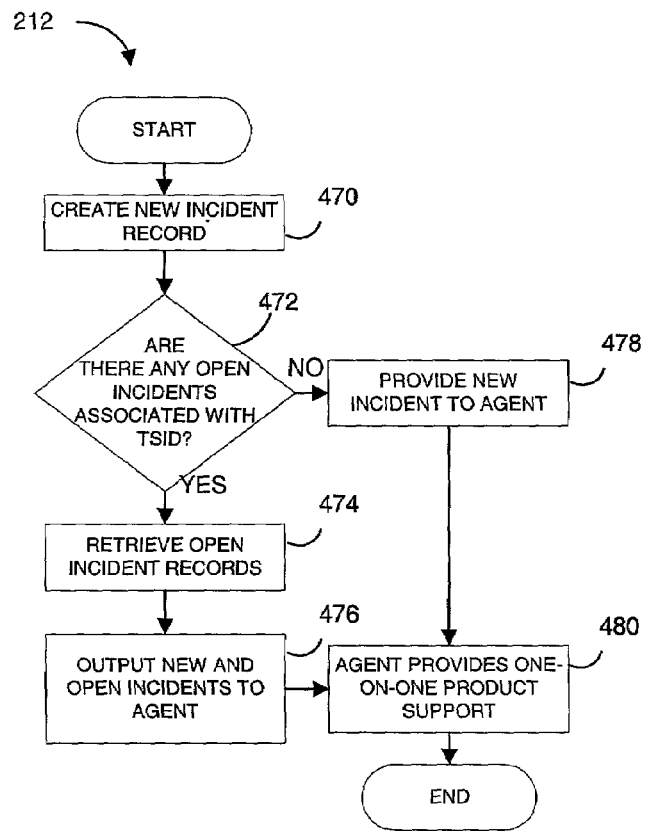
FIG. 4F illustrates one embodiment of delivering the assigned support level.

FIG. 4F illustrates one embodiment of delivering the assigned support level such as in block 212 of FIG. 2. Once the TSID is determined to be valid and that some level of product support is due (such as in blocks 202 through 210), then in block 470 of FIG. 4F, a new incident or call record is created. The new incident record is the customer's request for support that initiated the process of FIG. 2. Then, in block 472, the databases 310-320 are examined to determine if there are any open incidents associated with the unit TSID. For example, the same customer may have requested product support a week before and the request was not completed for any reason. In another example, the customer may be calling about the open incident. Because the open incident from the previous incident is still open, then the information related to the open incident may be relevant in helping the product support agent to resolve the current request for support. If there are no open incidents in block 472, then the new incident is provided to a product support agent. If there are open incidents in block 472, then the open incident records are retrieved in block 474. In block 476, the new and open incidents are output to the product support agent. The product support agent will therefore have both the current incident and the prior incident history so that the agent can most effectively and efficiently resolve the request from the customer. In one embodiment, the customer may be able to enter a specific incident number as a TSID, such as in block 204 of FIG. 2, and then the process could proceed directly to block 474 of FIG. 4F.

In an alternative embodiment, additional details of the customer's use of the unit identified by the TSID could also be gathered. For example, if the unit identified by the TSID is a SCSI controller card inside the customer's computer, then the operating system of the customer's computer (i.e., Windows™, Unix, Macintosh™, Solaris™, OS2™, Novell™, etc.) could also be gathered. Further details of the customer's computer such as software applications also installed or other peripheral devices installed could also be gathered. Such additional details of the customer's use of the unit identified by the TSID, as described above, can be as limited or as extensive as desired. The details may be used to place the incident in one of several queues. Each of the queues can represent a skill set of the product support agents. The incidents in each queue are then directed to a product support agent possessing the requisite skill. For example, if a first product support agent is well skilled in Windows™ issues but not skilled in Unix, then the first agent can better assist incidents in the queue for customers using Windows™.

Figure 4G:
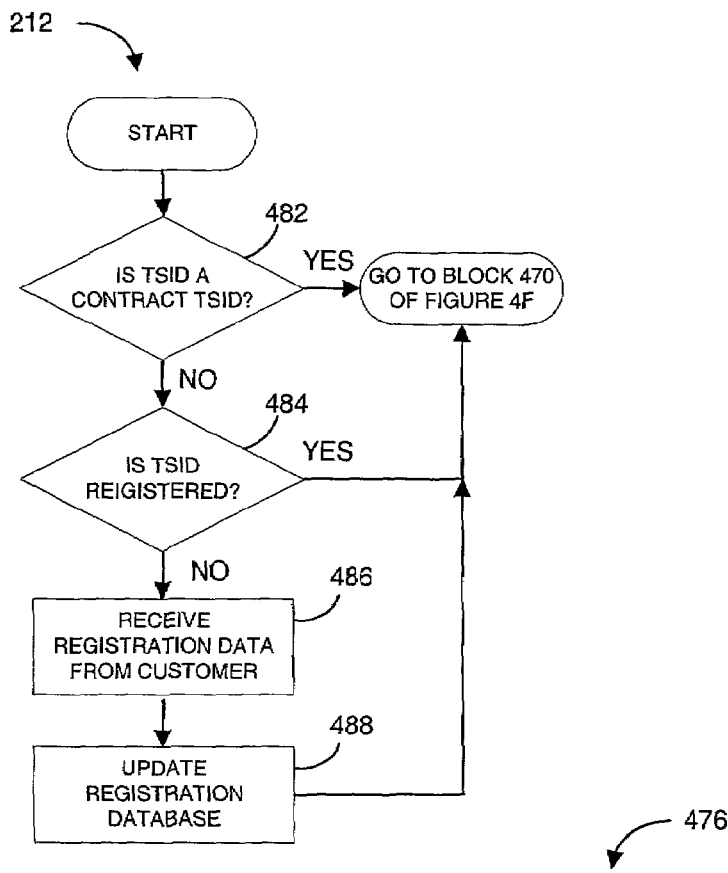
FIG. 4G illustrates an alternative embodiment of delivering the assigned support level that shows one method of collecting the customer registration information.

FIG. 4G illustrates an alternative embodiment of delivering the assigned support level (block 212 of FIG. 2 above) that shows one method of collecting the customer registration information. In block 482 the TSID is analyzed to determine if the TSID is classified as a contract TSID (such as in FIG. 4C above). If the TSID is a contract TSID, then the process continues at block 470 of FIG. 4F above. If the TSID is not a contract TSID in block 482, then the TSID is examined in block 484 to determine if the TSID is registered. The TSID is registered if the customer already registered the TSID in the product support registration database such as registration database 310 in FIG. 3 above. If the TSID was previously registered, then the process continues at block 470 of FIG. 4F above. If the TSID is not registered, then the registration data is requested and received from the customer in block 486. The registration database 310 is updated in block 488. The process continues at block 470 of FIG. 4F above.

Figure 4H:
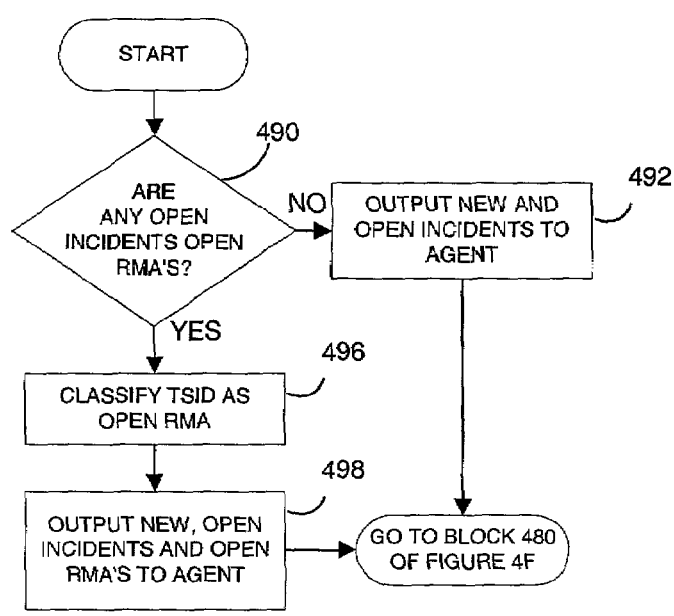
FIG. 4H illustrates one embodiment of outputting new and open incidents to the product support agent.

FIG. 4H illustrates one embodiment of outputting new and open incidents to the product support agent in block 476 of FIG. 4F to determine if any open incidents are open return materials authorizations (RMAs). In block 490, the open incidents are examined to determine if any of the open incidents are open RMAs. If none of the open incidents are open RMAs then the new and open incidents are output to the product support agent in block 492. The process continues in block 480 of FIG. 4F. If one or more of the open incidents are an open RMA, then the TSID is classified as an RMA. In one embodiment, a message and/or additional RMA instructions may be automatically sent to the customer that the RMA is open and that the particular unit must be returned to the manufacturer as per the RMA instructions before additional support can be provided. In another embodiment, the new incident, the open incident(s) and the open RMA incident(s) are forwarded to the product support agent such as in block 498. Then the process continues in block 480 of FIG. 4F. Classifying the TSID as an RMA TSID prevents an RMA'd unit from receiving additional support. Classifying the TSID as an RMA TSID also prevents a customer from receiving additional support until the manufacturer has received the RMA unit. RMAs are often a warranty replacement unit, i.e., the manufacturer has sent out a replacement unit before receiving the original failed unit. If the failed unit is not returned, then the customer may have sold the faulty original unit to a third party and now the third party is requesting support. Outputting the open RMA also provides up-to date information and TSID incident history for the product support agent's use in resolving the customer's issues.

Figure 5:
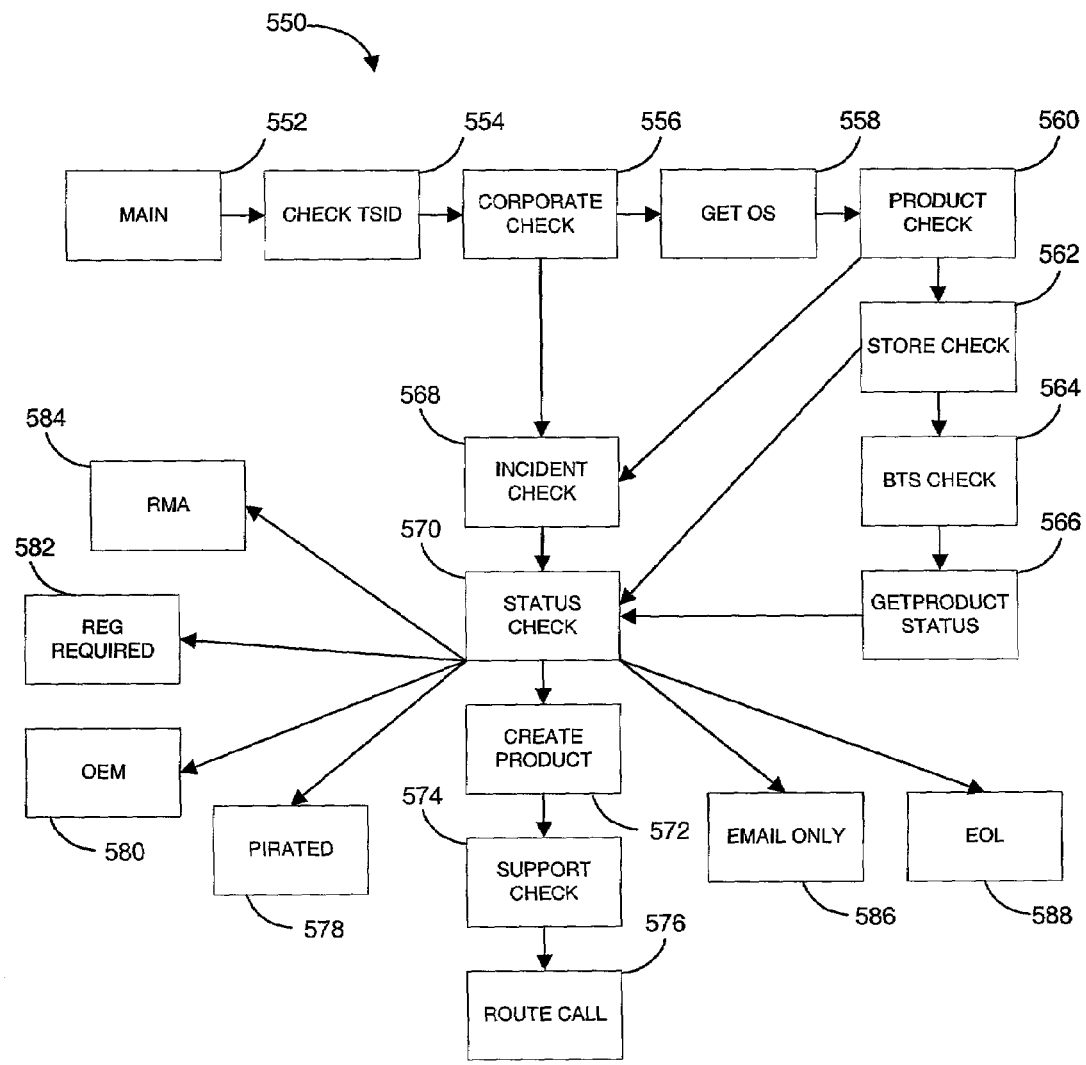
FIG. 5 illustrates one embodiment of an object diagram for a system for determining a support entitlement.

FIG. 5 illustrates one embodiment of an object diagram for a system 550 for determining a support entitlement such as may be used to represent objects in an object oriented program to determine a support entitlement. The system 550 can be enabled using various object oriented programming languages such as C++, Java™ and other languages. Similar functionality can also be enabled using other, non-object oriented languages such as C or other programming languages. The system 550 includes objects 552-588. Working together, the objects 552-588 can perform the processes described in FIGS. 2 and 4A-4H above. A Main object 552 receives the information from the customer, such as receiving the TSID in block 202 above. A Check TSID object 554 validates the TSID such as in block 206 above. A Corporate Check object 556 checks if the TSID is assigned to a contract such as in blocks 420 and 422 of FIG. 4C. A Get OS object 558 retrieves the customer's operating system or other aspects of the customer's computer system as described above. A Product Check object 560 retrieves product information related to the unit identified by the TSID. For example manufacturing date, sales data, etc. that may be stored in one or more database.

A Store Check object 562 provides a link to a retail sales database, such as a web site sales database, that may have additional information related to the TSID. A BTS Check object 564 queries manufacturing databases to retrieve related information about the unit identified by the TSID. A Get Product Status object 566 retrieves the current support status of the TSID. An Incident Check object 568 checks an incident database (i.e. incident database 312) to determine if there are open incidents related to the TSID. A Status Check object 570 determines if the support status of the open incidents such as in FIG. 4D or 4E above.

A Support Check object 574 determines the level of support authorized to a TSID such as if the TSID is within the supported time frame. A Route Call object 576 routes the customer's call to an appropriate queue as determined in block 212 of FIG. 2. An Email Only object 586 handles calls that are authorized email only support. An EOL (end of life) object 588 handles calls for TSID that identifies a unit with the status of end of life or, in one embodiment, with the status of no longer supported. A Pirated object 578 processes calls concerning units identified as an illicit TSID such as in FIGS. 4D and 4E above. An OEM object 580 processes calls identified as being OEM channel units. A Registration Required object 582 gathers registration information from the customer if the status check determines that the unit is not registered. A Create Product object 572 creates a registration data entry in a registration database such as registration database 310 in FIG. 3. A Return Materials Authorization object 584 processes RMAs for the TSID identified as a RMA TSID. Not all objects described in FIG. 5 are required and additional objects can also be included to enable various processes described herein.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations. An exemplary structure for the invention is described below.

Figure 6:
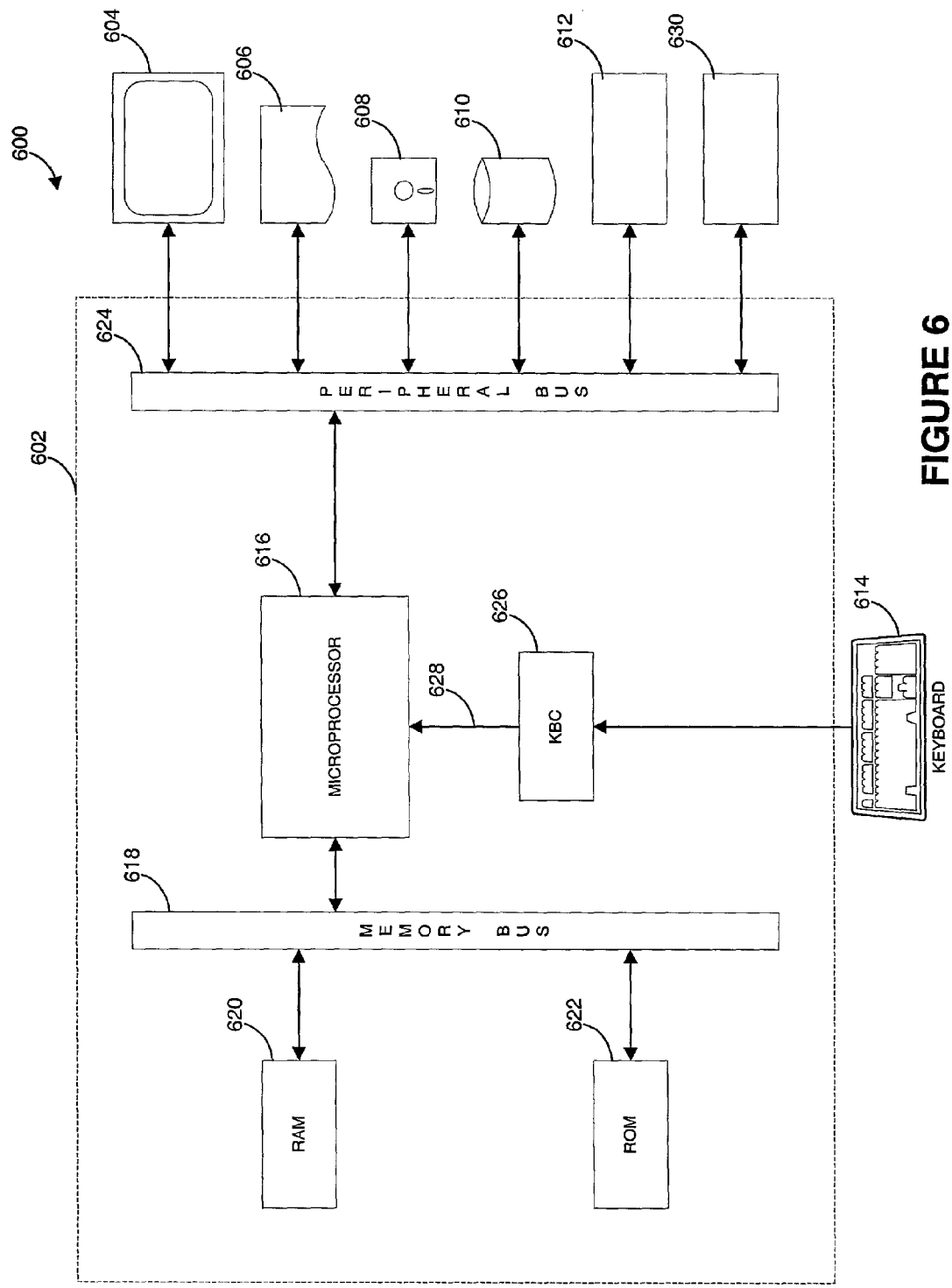
FIG. 6 is a block diagram of an exemplary computer system 500 for carrying out the processing according to the invention.

FIG. 6 is a block diagram of an exemplary computer system 600 for carrying out the processing according to the invention. For example, the computer system 600 could represent the ACD 304, the server 306 and the agent's desktop 330. The computer system 600 includes a digital computer 602, a display screen (or monitor) 604, a printer 606, a floppy disk drive 608, a hard disk drive 610, a network interface 612, and a keyboard 614. The digital computer 602 includes a microprocessor 616, a memory bus 618, random access memory (RAM) 620, read only memory (ROM) 622, a peripheral bus 624, and a keyboard controller (KBC) 626. The digital computer 602 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 616 is a general-purpose digital processor, which controls the operation of the computer system 600. The microprocessor 616 can be a single-chip processor or can be implemented with multiple components. Using instructions retrieved from memory, the microprocessor 616 controls the reception and manipulation of input data and the output and display of data on output devices.

The memory bus 618 is used by the microprocessor 616 to access the RAM 620 and the ROM 622. The RAM 620 is used by the microprocessor 616 as a general storage area and as scratch-pad memory, and can also be used to store input data and processed data. The ROM 622 can be used to store instructions or program code followed by the microprocessor 616 as well as other data.

The peripheral bus 624 is used to access the input, output, and storage devices used by the digital computer 602. In the described embodiment, these devices include the display screen 604, the printer device 606, the floppy disk drive 608, the hard disk drive 610, and the network interface 612. The keyboard controller 626 is used to receive input from keyboard 614 and send decoded symbols for each pressed key to microprocessor 616 over bus 628.

The display screen 604 is an output device that displays images of data provided by the microprocessor 616 via the peripheral bus 624 or provided by other components in the computer system 600. The printer device 606, when operating as a printer provides an image on a sheet of paper or a similar surface. Other output devices such as a plotter, typesetter, etc. can be used in place of, or in addition to, the printer device 606.

The floppy disk drive 608 and the hard disk drive 610 can be used to store various types of data. The floppy disk drive 608 facilitates transporting such data to other computer systems, and hard disk drive 610 permits fast access to large amounts of stored data.

The microprocessor 616 together with an operating system operate to execute computer code and produce and use data. The computer code and data may reside on the RAM 620, the ROM 622, or the hard disk drive 610. The computer code and data could also reside on a removable program medium and loaded or installed onto the computer system 600 when needed. Removable program media include, for example, CD-ROM, PC-CARD, floppy disk and magnetic tape.

The network interface 612 is used to send and receive data over a network connected to other computer systems. An interface card or similar device and appropriate software implemented by the microprocessor 616 can be used to connect the computer system 600 to an existing network and transfer data according to standard protocols. Examples of network interface devices 612 include a conventional telephone modem, an Integrated Services Digital Network (ISDN) adapter, a Digital Subscriber Line (DSL) adapter, a cable modem, a satellite transceiver, an Ethernet adapter, a cellular telephone receiver transmitter or the like.

The keyboard 614 is used by a user to input commands and other instructions to the computer system 600. Other types of user input devices can also be used in conjunction with the present invention. For example, pointing devices such as a computer mouse, a track ball, a stylus, or a tablet can be used to manipulate a pointer on a screen of a general-purpose computer.

Additional input output devices 630 could also be used for other I/O functions such as providing a direct interface with a telephone. For example, a telephone I/O interface would allow a telephone to directly enter data into the computer system 600 and also allow the computer system 600 to output audio and other information useable by the telephone.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

It will be further appreciated that the instructions represented by the blocks in FIGS. 2, 4A-4F are not required to be performed in the order illustrated, and that all the processing represented by the blocks may not be necessary to practice the invention. Further, the processes described in FIGS. 2, 4A-4F can also be implemented in software stored in any one of or combinations of the RAM 620, the ROM 622, or the hard disk drive 610.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of identifying a source of a counterfeit product unit comprising:
    receiving a product support request from a customer to an automated call distributor (ACD), wherein the product support request relates to a product manufactured by a receiving party;
    receiving a technical support identification (TSID) from the customer including establishing a data communication with the customer's product unit in response to receiving the TSID and automatically interrogating the product unit to identify the TSID for the product unit, wherein at least one of a plurality of aspects of the product unit is stored in a computer retrievable location in the product unit;
    validating the TSID;
    classifying the valid TSID as an illicit TSID classification if a unit corresponding to the TSID is identified as a counterfeit product unit including identifying the counterfeit product unit in at least one database;
    assigning at least one of a plurality of support levels to the classified, valid TSID wherein the assigned support level corresponds to the TSID classification and wherein the TSID is received, validated, classified and the support level assigned before an agent is notified of the product support request by the ACD; and
    enabling delivery of the assigned support level including notifying the customer that the product unit is illicit and denying all product support, reporting at least one of the customer or the source of the counterfeit product unit and blocking access to an agent.

2. The method of claim 1, wherein receiving the TSID includes:
    receiving at least one of a plurality of aspects of a unit from the customer;
    retrieving the TSID from at least one of a plurality of databases, wherein the retrieved TSID matches at least one of the plurality of aspects of the unit in the at least one of the plurality of databases.

3. The method of claim 2, wherein the plurality of aspects of the unit includes: a unit serial number, a host system serial number, a unit source and a unit part number.

4. The method of claim 1, wherein the TSID is numeric.

5. The method of claim 1, wherein validating the TSID includes at least one of a group consisting of:
    confirming the TSID includes a predetermined number of characters;
    confirming the TSID matches at least one TSID entry in at least one of a plurality of databases;
    confirming the TSID matches a predetermined format; and
    confirming the TSID includes a correct checksum.

6. The method of claim 1, wherein classifying the valid TSID includes:
    retrieving at least one of a plurality of aspects of the customer's unit from at least one of a plurality of databases.

7. The method of claim 1, wherein the plurality of support levels includes:
    an end of life support level;
    a knowledge base support level;
    an email support level;
    an original equipment manufacture (OEM) support level; and
    an illicit product support level.

8. The method of claim 1, wherein classifying the valid TSID includes:
    classifying the valid TSID as an original equipment manufacturer (OEM) TSID if the valid TSID is associated with a unit having an OEM channel in at least one of the plurality of databases.

9. The method of claim 8, wherein classifying the valid TSID includes:
    classifying the OEM TSID as an illicit TSID if the customer obtained the unit from a source other than the OEM channel.

10. The method of claim 1, wherein classifying the valid TSID as an illicit TSID includes identifying the source of the counterfeit product unit.

11. The method of claim 1 wherein the counterfeit product unit is at least one of a misrepresented product unit, an illegal duplicate of the product unit, an illegal duplicate installation of the product unit, a product unit that was improperly sold from the OEM channel.

12. The method of claim 1, wherein classifying the valid TSID into at least one of the plurality of classifications includes using a plurality of aspects of a unit to classify the valid TSID, wherein the unit corresponds to the valid TSID, and wherein the customer's OS is one of the plurality of aspects of the unit.

13. The method of claim 1, wherein reporting the source of the counterfeit product unit includes:
    notifying an internal or an external entity for further investigation.

14. The method of claim 1, wherein enabling delivery of the assigned support level includes
    creating a new incident record;
    determining if there is an open incident record associated with the valid TSID;
    retrieving the open incident record if the open incident is associated with the valid TSID; and
    outputting the new incident record and the open incident record to the agent.

15. A system for identifying a source of a counterfeit product unit comprising:
    an automated call distributor (ACD), wherein the ACD provides access to a customer and wherein the ACD includes:
        a processor;
        a memory system coupled to the processor, wherein the memory system includes instructions executable by the processor to:
            receive a product support request from a customer, wherein the product support request relates to a product manufactured by a receiving party;
            receive a technical support identification (TSID) from a customer including establishing a data communication with the customer's product unit in response to receiving the TSID and automatically interrogating the product unit to identify the TSID for the product unit, wherein at least one of a plurality of aspects of the product unit is stored in a computer retrievable location in the product unit;

validate the TSID;

classify the valid TSID as an illicit TSID classification if a unit corresponding to the TSID is identified as a counterfeit product unit including identifying the counterfeit product unit in at least one database;

assign at least one of a plurality of support levels to the classified, valid TSID wherein the assigned support level corresponds to the TSID classification and wherein the TSID is received, validated, classified and the support level assigned before an agent is notified of the product support request; and enabling delivery of the assigned support level including notifying the customer that the product unit is illicit and denying all product support, reporting at least one of the customer or the source of the counterfeit product unit and blocking access to an agent.

16. The system of claim 15, the memory system further includes instructions executable by the processor to report the source of the counterfeit product unit includes notifying an internal or an external entity for further investigation.

17. The system of claim 15, wherein the ACD includes a server.

18. The system of claim 15 wherein the ACD includes access to a plurality of databases.

19. The system of claim 15 further comprising an agent's desktop, wherein the agent's desktop is linked to the ACD.

20. The system of claim 15 wherein the access to the customer includes a telephone interface.

* * * * *